United States Patent Office 2,827,468
Patented Mar. 18, 1958

2,827,468

TETRAHYDROPYRANYL- AND ALKYLTETRAHYDROPYRANYL-SUBSTITUTED SPIRO HETEROCYCLIC PHOSPHORUS COMPOUNDS

William M. Lanham, Charleston, W. Va., assignor to Union Carbide Corporation, a corporation of New York No Drawing. Application January 3, 1956
Serial No. 556,805
9 Claims. (Cl. 260—345.9)

This invention relates to a novel class of tetrahydropyranyl-substituted spiro heterocyclic phosphorus compounds, and corresponding dialkyl- and tetraalkyltetrahydropyranyl-substituted spiro heterocyclic phosphorus compounds.

The invention also concerns novel processes for the production of such compounds from 2-methyloltetrahydropyranyl-tetrahydropyranyl-carbinol and the corresponding (2-methyloldialkyl- and tetraalkyltetrahydropyranyl)- (dialkyl- and tetraalkyltetrahydropyranyl)-carbinols.

The novel products of the invention have structures apparently corresponding to the formula:

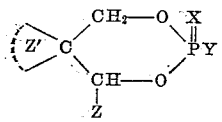

wherein Z is a member of the class consisting of the tetrahydropyran-2-yl, the 3,4-dialkyl- and 3,3,4,4-tetraalkyltetrahydropyran-2-yl, the tetrahydropyran-3-yl, and the 2,4-dialkyl- and 2,2,4,4-tetraalkyltetrahydropyran - 3 - yl radicals; Z' is a radical of the class consisting of the —CRR'CRR'CH$_2$CH$_2$O— and —CRR'OCH$_2$CH$_2$CRR'— radicals, wherein R and R' respectively designates a member of the class consisting of hydrogen and the alkyl groups; X designates a member of the class consisting of oxygen and sulfur; Y designates a member of the class consisting of chlorine, bromine and the —SH radicals; and Y is —SH only when X is S. Each alkyl radical preferably has one to eight carbon atoms.

A typical compound of the invention is spiro {[2-chloro-4-(3″,4″ - dimethyltetrahydropyran-2″-yl)-2-oxo-1,3,2-dioxaphosphorinane] - 5,2' - (3',4' - dimethyltetrahydropyran)}, having the structure:

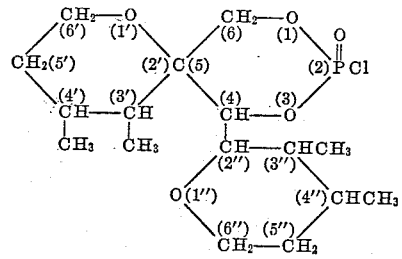

The novel products of the invention are made by reacting phosphoryl chloride, phosphoryl bromide, thiophosphoryl chloride or phosphorus pentasulfide with a glycol of the structure:

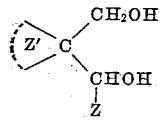

wherein Z and Z' have the meanings hereinbefore indicated. Such glycols are made in well known manner by dimerizing acrolein or a beta- alkyl- or dialkyl-substituted acrolein, followed by the aldol condensation of the resultant aldehyde, and subsequent hydrogenation of the unsaturated condensation product. Such processes are described in the pending application, Serial No. 436,702 of H. R. Guest and B. W. Kiff, filed June 14, 1954, and in U. S. Patents 2,479,284 and 2,481,377, and British Patent 667,131.

The products of this invention have been found to be useful as pesticides. They likewise are useful intermediates for the preparation of novel phosphate esters. For example, the phosphorus halides of this invention react with alcohols, alkali metal salts of alcohols and phenols, ammonia and amines to yield neutral esters which are useful as plasticizers for vinyl resins, and as dyeing assistants, and petroleum additives.

The dithiophosphoric acid derivatives of the invention are useful as vulcanization accelerators for rubber, as promotors in the flotation of sulfide ores, and oil additives, either as such or in the form of metallic salts thereof. Their principal utility is as intermediates; and they add readily to alpha, beta-olefinically unsaturated compounds to yield neutral esters that are useful as pesticides, plasticizers for vinyl resins, and as corrosion inhibitors, flotation agents and petroleum additives.

In the practice of one modification of the invention for the production of substituted spiro heterocyclic phosphoryl halides, a compound of the structure:

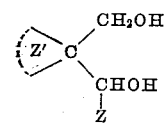

wherein Z and Z' have the hereinbeforedescribed meanings, is reacted with phosphoryl chloride or phosphoryl bromide at temperatures within the range from 10° to 40° C., preferably in equimolar proportions, although an excess of either reactant can be used. It is preferred to add the phosphoryl halide to a solution of the diol in an inert solvent such as benzene, although this addition can be reversed with no deleterious effect. The addition usually is made while maintaining the reaction mixture at about 25° C. under around 500 mm. of mercury pressure. Atmospheric pressure can be used and the pressure later reduced to eliminate by-product hydrogen halide. The resultant product readily can be purified by crystallization from ethyl ether or other suitable inert solvent, but this is not necessary unless an excess of the diol is used. The product is readily secured in essentially quantitative yield as a residue product of high purity.

In a modification of the invention for producing substituted spiro heterocyclic thiophosphoryl halides, a diol of the aforesaid structure:

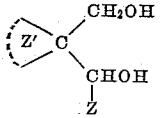

is reacted with thiophosphoryl chloride or thiophosphoryl bromide, in the presence of a tertiary amine as a hydrogen chloride sequestering agent, as illustrated by the equation:

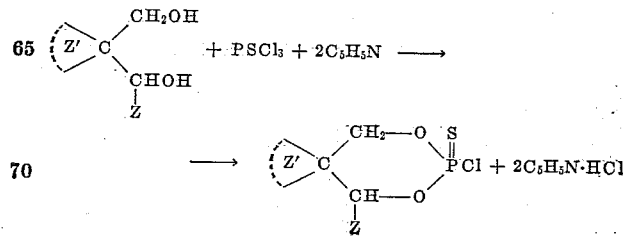

The reaction can be conducted at temperatures within the range from 25° to 60° C., although 40° C. is preferred, at which the exothermic reaction proceeds smoothly and quickly. The reaction is conducted in the presence of an inert diluent, preferably a hydrocarbon of the benzenoid class. Preferably the thiophosphoryl halide is added dropwise to an agitated solution of an equimolar quantity of the diol and the theoretical amount of tertiary amine in solution in benzene. If desired a benzene solution of the diol can be added to the thiophosphoryl halide in pyridine and benzene. An excess of either reactant can be employed. The reaction mixture is washed with water to remove the last trace of amine hydrohalide. A substantially pure residue product can be obtained. If desired the latter can be further purified by recrystallization from a suitable solvent such as diethyl ether.

In another modification of the invention for producing substituted spiro heterocyclic dithiophosphoric acids, a diol of the aforesaid structure:

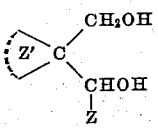

is reacted with phosphorus pentasulfide, at temperatures within the range from 25° to 125° C., although reaction temperatures of 70° to 80° C. are preferred, the reaction proceeding according to the equation:

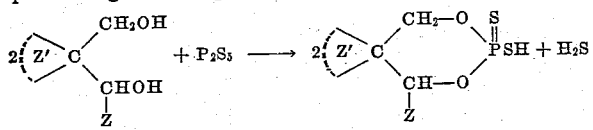

Preferably stoichiometric amounts of the two reactants are employed, but an excess of either reactant can be employed. Preferably the reaction is conducted in the presence of an inert solvent such as benzene, toluene, the xylenes and ethylbenzene, if either the diol reactant or the desired product is a solid. While preferably a toluene solution of the diol is added to an agitated suspension of phosphorus pentasulfide in toluene, the pentasulfide can be added in small successive amounts to the agitated toluene solution of the diol.

The desired product can be crystallized from the reaction mixture when toluene is used as solvent. If desired the purification can be effected by converting it to the corresponding sodium salt by treatment with an aqueous sodium hydroxide solution, the separation of the aqueous and oily layers thus formed, and the treatment of the aqueous layer with a mineral acid such as hydrochloric acid to regenerate the desired product.

The following examples serve to illustrate the invention.

Example 1

To an agitated solution of 461 grams (2 mols) of 2-methyloltetrahydropyran - 2 - yl - tetrahydropyran - 2'-yl-carbinol in 400 cc. of benzene, held at 25° C. under 500 mm. of mercury pressure, there were added dropwise during 37 minutes, 307 grams (2 mols) of phosphoryl chloride. After holding the reaction mixture at that temperature and pressure for an additional hour, then reducing the pressure to 350 mm. of mercury for one hour, then under less than 2 mm. of mercury at 25° C. for 44 hours, and finally at 45° C. under less than 2 mm. of mercury for one hour, there was obtained spiro [(2-chloro - 2 - oxo - 4 - tetrahydropyran - 2" - yl - 1,3,2-dioxaphosphorinane) - 5,2'-tetrahydropyran] in the form of 618 grams (theory=621 grams) of a solid residue product having the following properties: melting point= 145°–150° C., percent purity (by esterification)=98.7; analysis (in percent by weight): percent P=9.70 (theory =9.97); percent Cl=11.04 (theory=11.42); percent C =46.70 (theory=46.39); percent H=6.74 (theory= 6.49).

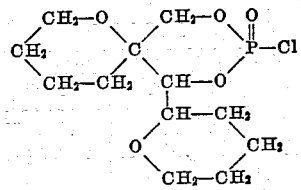

Example 2

Spiro[(2 - chloro - 4 - tetrahydropyran-2"-yl-2-thiono-1,3,2-dioxaphosphorinane)-5,2'-tetrahydropyran] was prepared by the dropwise addition during 30 minutes of 169 grams (1 mol) of thiophosphoryl chloride to an agitated solution of 230 grams (1 mol) of 2-methyloltetrahydropyran-2-yl-tetrahydropyran-2'-yl-carbinol, 158 grams (2 mols) of pyridine, and 1000 cc. of benzene, while maintaining the reaction mixture at 40° C. The mixture then was agitated for 2 additional hours at 25° C., and then stood overnight. The mixture then was filtered and the residue (pyridine hydrochloride) washed with ethyl ether. The combined filtrate and ether washings were neutralized with a concentrated aqueous sodium bicarbonate solution, washed with 200 cc. of water, dried over calcium sulfate, filtered, and the filtrate stripped by distillation to a kettle temperature of 25° C. under less than 2 mm. of mercury pressure. The resultant solid was purified by mixing with 800 cc. of ethyl ether and filtering. There was thus secured 176 grams of the desired product in the form of a white solid residue which, after air drying, had the following properties: melting point=146°–156° C.; percent purity (by esterification)=97.7; analysis (in percent by weight): percent P=9.55 (theory=9.48); percent Cl=10.26 (theory=10.86); percent S=10.6 (theory= 9.81); percent C=43.30 (theory=44.12); percent H= 5.96 (theory=6.17). The filtrate from the last-named filtration was stripped by distillation at a kettle temperature of 25° C. under less than 2 mm. of mercury pressure and yielded 108 grams of the same solid residue product slightly inferior to that described above.

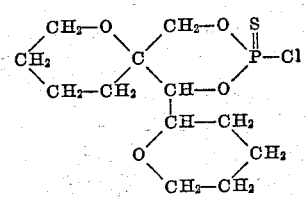

Example 3

Spiro[(2 - mercapto-4-tetrahydropyran-2"-yl-2-thiono-1,3,2-dioxaphosphorinane)-5,2'-tetrahydropyran] was prepared by the dropwise addition during 35 minutes of a solution of 115 grams (0.5 mol) of 2-methyloltetrahydropyran-2-yl-tetrahydropyran-2'-yl-carbinol in 100 cc. of toluene to an agitated suspension of 55.5 grams (0.25 mol) of phosphorus pentasulfide in 200 cc. of toluene while maintaining the reaction mixture at 70°–80° C. The mixture was heated for an additional 30 minutes at 80° C. at which time evolution of hydrogen sulfide had ceased. The reaction mixture was filtered, and the filtrate was stripped by distillation to a kettle temperature of 40° C. under 20 mm. of mercury pressure, cooled to −20° C., and filtered. The residue from the latter filtration was washed with ethyl ether and air dried. There was thus secured 89 grams of the aforesaid spiro compound in the form of a white solid having the following properties: melting point=125°–130° C.; percent purity (by acidity)=98.9%; analysis (percent by weight): percent P=10.46 (theory=9.55); percent S=19.2 (theory=

19.76); percent C=45.00 (theory=44.46); percent H= 6.58 (theory=6.51).

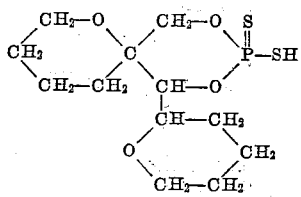

By substituing in the process illustrated by the foregoing examples for the 2-methyloltetrahydropyran-2-yl-tetrahydropyran-2'-yl-carbinol corresponding 2-methyloldialkyl- and tetraalkyl-tetrahydropyran-2-yl-dialkyl- and tetraalkyltetrahydropyran-2'-yl-carbinols, of the type hereinbefore described, corresponding 2-halo-2-oxo-1,3,2-dioxaphosphorinanes, 2-halo - 2 - thiono-1,3,2-dioxaphosphorinanes and 2-mercapto-2-thiono-1,3,2-dioxaphosphorinanes are produced. Preferably each alkyl substituent in the tetrahydropyranyl ring, when present, contains 1 to 8 carbon atoms. Thus, the reaction of phosphoryl chloride with 2 - methylol-3,4-dialkyltetrahydropyran-2-yl-3',4'-dialkyltetrahydropyran-2'-yl carbinol yields spiro{[2-chloro-4-(3″,4″-dialkyltetrahydropyran-2″-yl)-2-oxo - 1,3,2 - dioxaphosphorinane]-5,2'-(3',4' - dialkyltetrahydropyran)}.

The following 1,3-diols are further illustrative of compounds useful as diol starting materials in the practice of the invention:

2 - methylol-3,4-diethyltetrahydropyran-2-yl-3'-4'-diethyltetrahydropyran-2'-yl-carbinol 2 - methylol - 3,3,4,4 - tetramethyltetrahydropyran-2-yl-3',3',4',4'-tetramethyltetrahydropyranyl-2'yl-carbinol 2 - methylol-3,4-di-n-propyltetrahydropyran-2-yl-3',4'-di-n-propyltetrahydropyran-2'-yl-carbinol 2 - methylol-3,4-di-n-butyltetrahydropyran-2-yl-3',4'-di-n-butyltetrahydropyran-2'-yl-carbinol 2 - methylol-3,4-di-n-hexyltetrahydropyran-2-yl-3',4'-di-n-hexyltetrahydropyran-2'-yl-carbinol 2 - methylol-3,4-di-n-pentyltetrahydropyran-2-yl-3',4'-di-n-pentyltetrahydropyran-2'-yl-carbinol 2-methylol - 3,4 - di-n-undecyltetrahydropyran-2-yl-3',4'-di-n-undecyltetrahydropyran-2'-yl-carbinol 2 - methylol-3,4-di-(1-ethylpropyl)-tetrahydropyran-2-yl-3',4'-di-(1-ethylpropyl)-tetrahydropyran-2'-yl - carbinol 2 - methylol-3,4-di-(1-ethylpentyl)-tetrahydropyran-2-yl-3',4'-di-(1-ethylpentyl)-tetrahydropyran - 2'-yl-carbinol 2-methylol-3,3,4,4 - tetra-n-butyltetrahydropyran - 2 - yl- 3',3',4',4'-tetra-n-butyltetrahydropyran-2'-yl-carbinol 2-methylol-3,3,4,4 - tetra-n-hexyltetrahydropyran - 2 - yl- 3',3',4',4'-tetra-n-hexyltetrahydropyran-2'-yl-carbinol 2-methylol - 3,3,4,4-tetra-(2-ethylhexyl)-tetrahydropyran- 2 - yl - 3',3',4',4'-tetra-(2-ethylhexyl)-tetrahydropyran-2'-yl-carbinol Each of these compounds can be reacted with phosphoryl chloride, phosphoryl bromide, thiophosphoryl chloride or bromide or phosphorus pentasulfide in accordance with the invention with the production of novel spiro heterocyclic phosphorus compounds of the type described.

As already indicated, the novel products of this invention are useful pesticides. Thus, the compound of Example 1 is an effective insecticide, giving a 90–100% kill of red spider mites when used in concentrations as low as 30 milligrams per 100 cc. of aqueous solution, and giving a 90–100% kill of bean aphids in 24 hours when used in concentrations of only 15 milligrams per 100 cc. of aqueous solution. The compound made in Example 2 is highly effective in giving a 90–100% control of Mexican bean beetle larvae in 72 hours when used in concentrations of only 7.5 milligrams per 100 cc. of aqueous solution.

The invention is susceptible of modification within the scope of the appended claims.

I claim:

1. As new compounds, tetrahydropyranyl-substituted spiro heterocyclic phosphorus compounds having structures designated by the formula

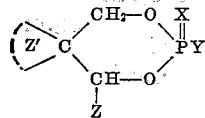

wherein Z is a member of the class consisting of the tetrahydropyran-2-yl, the 3,4-dialkyl- and 3,3,4,4-tetraalkyltetrahydropyran-2-yl and the tetrahydropyran-3-yl, and 2,4-dialkyl- and 2,2,4,4-tetraalkyltetrahydropyran-3-yl radicals wherein each alkyl group contains from 1 to 11 carbon atoms; and Z' is a radical of the class consisting of the —CRR'CRR'CH$_2$CH$_2$O— and

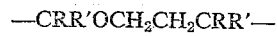

radicals, wherein R and R' respectively designates a member of the class consisting of hydrogen and the alkyl groups having from 1 to 11 carbon atoms; X designates a member of the class consisting of oxygen and sulfur; Y designates a member of the class consisting of chlorine, bromine and the —SH radicals; and Y is —SH only when X is S.

2. The product defined in claim 1 wherein each alkyl radical present has 1 to 8 carbon atoms.

3. As a new compound, spiro [(2-chloro-2-oxo-4-tetrahydropyran - 2″ - yl - 1,3,2 - dioxaphosphorinane) - 5,2' - tetrahydropyran.].

4. As a new compound, spiro [(2-chloro-4-tetrahydropyran - 2″ - yl - 2 - thiono - 1,3,2 - dioxaphosphorinane) - 5,2'-tetrahydropyran].

5. As a new compound, spiro [(2-mercapto-4-tetrahydropyran - 2″ - yl - 2 - thiono - 1,3,2 - dioxaphosphorinane)-5,2'-tetrahydropyran].

6. Process which comprises reacting phosphoryl chloride with a glycol of the structure

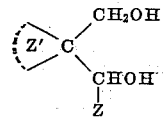

wherein Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl- and 2,2,4,4-tetraalkyltetrahydropyran-3-yl radicals wherein each alkyl group contains from 1 to 11 carbon atoms; and Z' is a radical of the class consisting of the —CRR'CRR'CH$_2$CH$_2$O— and

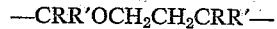

radicals, wherein R and R' respectively designate a member of the class consisting of hydrogen and the alkyl groups having from 1 to 11 carbon atoms, in approximately equal molar proportions at temperatures within the range from 10° to 40° C., in the presence of an inert solvent, and recovering from the reaction mixture the resultant spiro compound of the structure

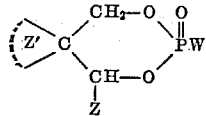

where Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl and 2,2,4,4 - tetraalkyltetrahydropyran - 3 - yl radicals; Z' is a radical of the class consisting of the —CRR'CRR'CH$_2$CH$_2$O— and —CRR'OCH$_2$CH$_2$CRR'— radicals wherein R and R', respectively, designate a member of the class consisting of hydrogen and the alkyl 7. Process which comprises reacting thiophosphoryl chloride with a diol of the structure

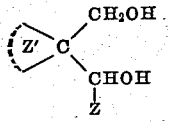

wherein Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl- and 2,2,4,4-tetraalkyltetrahydropyran-3-yl radicals wherein each alkyl group contains from 1 to 11 carbon atoms; and Z' is a radical of the class consisting of the —CRR'CRR'CH₂CH₂O— and

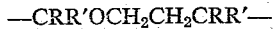

radicals, wherein R and R' respectively designate a member of the class consisting of hydrogen and the alkyl groups having from 1 to 11 carbon atoms, at temperatures within the range from 25° to 60° C. in the presence of a hydrogen chloride sequestering agent, and in the presence of an inert diluent, and recovering from the reaction mixture the resultant spiro compound of the structure

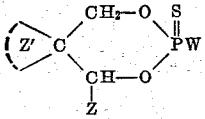

where Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl and 2,2,4,4 - tetraalkyltetrahydropyran - 3 - yl radicals wherein each alkyl group has from 1 to 11 carbon atoms; Z' is a radical of the class consisting of the —CRR'CRR'CH₂CH₂O— and —CRR'OCH₂CH₂CRR'— radicals wherein R and R', respectively, designate a member of the class consisting of hydrogen and the alkyl groups having from 1 to 11 carbon atoms; and W designates a member of the class consisting of chlorine.

8. Process which comprises reacting phosphorus pentasulfide, at temperatures within the range from 25°–125° C., with a diol of the structure

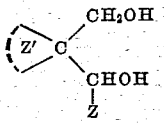

wherein Z is a member of the class consisting of the tetrapyran-2-yl, the 3,4-dialkyl- and 3,3,4,4-tetraalkyltetrahydropyran-2-yl, and the tetrahydropyran-3-yl, and 2,4-dialkyl- and 2,2,4,4 - tetraalkyltetrahydropyran - 3 - yl radicals wherein each alkyl group contains from 1 to 11 carbon atoms; and Z' is a radical of the class consisting of the —CRR'CRR'CH₂CH₂O— and

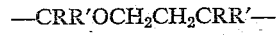

radicals, wherein R and R' respectively designate a member of the class consisting of hydrogen and the alkyl groups having from 1 to 11 carbon atoms, in the presence of an inert solvent for the reactants and reaction product, and recovering from the reaction mixture the resultant spiro compound of the structure

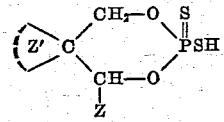

where Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl and 2,2,4,4 - tetraalkyltetrahydropyran - 3 - yl radicals; and Z' is a radical of the class consisting of the —CRR'CRR'CH₂CH₂O— and —CRR'OCH₂CH₂CRR'— radicals wherein R and R', respectively, designate a member of the class consisting of hydrogen and the said alkyl groups.

9. Process which comprises reacting a compound of the class consisting of phosphoryl chloride, phosphoryl bromide, thiophosphoryl chloride, thiophosphoryl bromide and phosphorus pentasulfide with a glycol of the structure

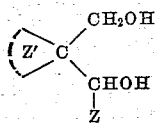

wherein Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl- and 2,2,4,4-tetraalkyltetrahydropyran-3-yl radicals wherein each alkyl radical has from 1 to 11 carbon atoms; and Z' is a radical of the class consisting of the —CRR'CRR'CH₂CH₂O— and

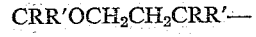

radicals, wherein R and R' respectively designates a member of the class consisting of hydrogen and the alkyl groups having from 1 to 11 carbon atoms, in the presence of an inert solvent, and recovering from the reaction mixture the resultant spiro compound of the structure.

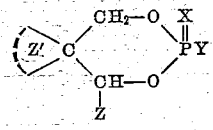

wherein Z is a member of the class consisting of the tetrahydropyran-2-yl, the 3,4-dialkyl- and 3,3,4,4-tetraalkyltetrahydropyran-2-yl, and the tetrahydropyran-3-yl, and 2,4-dialkyl- and 2,2,4,4-tetraalkyltetrahydropyran-3-yl radicals wherein each alkyl group contains from 1 to 11 carbon atoms; Z' is a radical of the class consisting of the —CRR'CRR'CH₂CH₂O— and

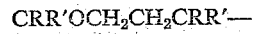

radicals wherein R and R', respectively, designates a member of the class consisting of hydrogen and the alkyl groups having from 1 to 11 carbon atoms; X designates a member of the class consisting of oxygen and sulfur; Y designates a member of the class consisting of chloride, bromide and the —SH radicals; and Y is —SH only when X is S.

No references cited.